United States Patent [19]
Kim et al.

[11] Patent Number: 5,840,642
[45] Date of Patent: Nov. 24, 1998

[54] DIELECTRIC MATERIAL FOR MICROWAVE OF $CaTiO_3$-$La(Mg_{1/2}Ti_{1/2})O_3$-$LaAlO_3$ GROUP

[75] Inventors: Kyung Yong Kim, Seoul; Whan Choi, Choongcheongbuk-Do, both of Rep. of Korea

[73] Assignee: Korea Institute of Science and Technology, Rep. of Korea

[21] Appl. No.: 912,181

[22] Filed: Aug. 15, 1997

[30] Foreign Application Priority Data

Aug. 17, 1996 [KR] Rep. of Korea .................. 1996 34072

[51] Int. Cl.[6] .................................................. L04B 35/465
[52] U.S. Cl. .......................................................... 501/136
[58] Field of Search ................................................ 501/136

[56] References Cited

PUBLICATIONS

Nishigaki, ET AL., "$BaO$–$TiO_2$–$WO_3$ Microwave Ceramics and Crystalline $BaWO_1$", J. Am. Ceram. Soc., 71 [1] C–11–c–17 (1988) No month avail.

Wakino et al., Microwave Characteristics of $(Zr, Sn)TiO_4$ and $BaO$–$PbO$–$Nd_2O_3$–$TiO_2$ Dielectric Resonators J. Amer. Ceram. Soc. 67[4]:278–281 Apr. 1984.

Youn et al, "Microstructual Characteristics of $Ba(Mg_{1/3}Ta_{2/3})O_3$ Ceramics and its Related Microwave Dielectric Properties", Jpn. J. Appl. Phys. vol. 35 (1996) no month avail. pp. 3947–3953.

Primary Examiner—David Brunsman
Attorney, Agent, or Firm—Fish & Richardson P.C.

[57] ABSTRACT

The present invention relates to a dielectric material for a microwave of a $CaTiO_3$-$La(Mg_{1/2}Ti_{1/2})O_3$-$LaAlO_3$ group. The dielectric material for a microwave according to the present invention includes a composition condition of $0.3 \leq x \leq 0.6$ and $0 \leq y \leq 1.0$ wherein $(1-x)CaTiO_3$-$x[(1-y)La(Mg_{1/2}Ti_{1/2})O_3$-$yLaAlO_3]$. The high frequency dielectric material includes an dielectric constant of above 40, a low dielectric loss, and a temperature coefficient of a resonant frequency which is easily variable from a positive (+) value to a negative (−) value with respect to the value of 0 ppm/°C.

2 Claims, 2 Drawing Sheets

DIELECTRIC MATERIAL FOR MICROWAVE OF $CaTiO_3$-$La(Mg_{1/2}Ti_{1/2})O_3$-$LaAlO_3$ GROUP

BACKGROUND OF THE INVENTION

1. Field of the Invention

The present invention relates to a dielectric material for a microwave of a $CaTiO_3$-$La(Mg_{1/2}Ti_{1/2})O_3$-$LaAlO_3$ group, and in particular to an improved dielectric material for a microwave of a $CaTiO_3$-$La(Mg_{1/2}Ti_{1/2})O_3$-$LaAlO_3$ group which has a low dielectric loss and an excellent temperature coefficient of a resonant frequency.

2. Description of the Conventional Art

Recently, as a communication system which uses a microwave (a frequency band: 300MHz~300GHz) for a satellite broadcast including a mobile communication such as a wireless telephone set or a vehicle telephone set advances, the applications of a high frequency dielectric ceramic to a resonator device, a band pass(or blocking) filter, a microwave integrated circuit (MIC), etc. is sharply increased.

For the high frequency dielectric used for a communication system using a microwave, 1) Since the wavelength of a microwave is inversely proportional to square root of an dielectric constant, the dielectric constant must be high for the compactness of the product, 2) Since the dielectric loss is increased proportionally to the frequency, the value of Q (the reverse value of the dielectric loss) must be high for a high performance, and 3) The temperature coefficient of the resonant frequency of a dielectric resonator must be small.

Additionally, the time lapse-based variation must be small, and the thermal conductivity and mechanical strength must be high.

As a microwave dielectric material, there are known a solid solution having a combined perovskite structure such as $Ba(Mg_{1/3}Ta_{2/3})O_3$ having an dielectric constant of 20~30 and a quality coefficient of $Qxf_0=200,000$, a simple solid solution such as $(Zr, Sn)TiO_4$ having an dielectric constant of 30~40 and a quality coefficient of $Qxf_0=50,000$, a combined phase material such as $(Ba, Pb)O$-$Nd_2O_3$-$TiO_2$ having an dielectric constant of 80~90 and a quality coefficient of $Qxf_0=6,000$. The above-described materials will be explained, in more detail, based on the articles by the dielectric constant.

First, as materials having a lower dielectric loss while the dielectric constant is below 40, there are known:

1) $Ba(M^{+2}{}_{1/3}M^{+5}{}_{2/3})O_3(M^{+2}=Mg, Zn, M^{+5}=Ta, Nb)$ group [Reference article: K. Matsumoto, T. Hiuga, K. Takada and H. I Chimura, "$Ba(Mg_{1/3}Ta_{2/3})O_3$ ceramics with ultra-low loss at microwave frequencies" In proce, of the sixth IEEE International symposium on Applications of Ferroelectrics, pp. 118–121 (1986)], 2) $Ba_2Ti_9O_{20}$ group [Reference article: S. Nisikaki et al., "$BaO$-$TiO_2$-$WO_3$ Microwave Ceramics and Crystalline $BaWO_4$", J. Am. Ceram. Soc., 71(1), C-11~C-17(1988)], and 3) $(Zr, Sn)TiO_4$ group [Reference article: K. Wakino et al., "Microwave characteristics of $(Zr, Sn)TiO_4$ and BaO-PbO-$Nd_2O_3$-$TiO_2$ Dielectric resonators," J. Am. Ceram. Soc., 67(4), 278~281 (1983)].

In addition, as materials having an dielectric constant of above 80 where the dielectric loss is relatively high, and $[Qxf_0(GHz)]<10,000$, there are known:

1) $BaO$-$Sm_2O_3$-$TiO_2$ group [Reference article: J. M. wu and M. C. chang, "Reaction Sequence and Effects of calcination and sintering on Microwave Properties of $(Ba, Sr)O$-$Sm_2O_3$-$TiO_2$ ceramics," J. Am. Ceram. Soc., 73(6), 1599~1605 (1990)], 2) $(Ba, Pb)O$-$Nd_2O_3$-$TiO_2$ group [Reference article: K. Wakino et al., "microwave characteristics of $(Zr, Sn)TiO_4$ and BaO-PbO-$Nd_2O_3$-$TiO_2$ Dielectric Resonators," J. Am. Ceram. Soc., 67(4), 278~281 (1983)], and 3) $(Pb, Ca)ZrO_3$ group [Reference article: J. Kato, "Material Produces Small Resonators with High Dielectric Constant," JEE, Sep., 114~118 (1991)].

Generally, in the material having a high dielectric constant, a dielectric loss and the temperature coefficient of a resonant frequency are increased due to the bipolar of a dielectric and the internal defects thereof. In the high frequency dielectric, when the temperature coefficient of a resonant frequency is ±10 ppm/°C., the application thereof becomes available.

In the case of $CaTiO_3$, the dielectric constant is 170~180 at 3 GHz, namely, the same is relatively high. However, there is a problems in that the temperature coefficient of the resonant frequency is +800ppm/°C., namely, the same is greatly high. In the case of $La(Mg_{1/2}Ti_{1/2})O_3$, the dielectric constant is about 28, namely, the same is low. However, the quality coefficient $[Qxf_0, (GHz)]$ is about 55,000, namely, the same is greatly high, and the temperature coefficient of a resonant frequency is −70 ppm/°C. In addition, in the case of $LaAlO_3$, the dielectric constant is about 26~27, and the temperature coefficient is about +90 ppm/°C.

SUMMARY OF THE INVENTION

Accordingly, it is an object of the present invention to provide a dielectric material for a microwave of $CaTiO_3$-$La(Mg_{1/2}Ti_{1/2})O_3$-$LaAlO_3$ group which overcomes the aforementioned problems encountered in the conventional art.

It is another object of the present invention to provide a dielectric material for a microwave of $CaTiO_3$-$La(Mg_{1/2}Ti_{1/2})O_3$-$LaAlO_3$ group which has an dielectric constant of below 40, a low dielectric loss, and a temperature coefficient of a resonant frequency which is variable from a positive (+) value to a negative (−) value with respect to the value of 0 ppm/°C. by using the advantages of the characteristics of $CaTiO_3$, $La(Mg_{1/2}Ti_{1/2})O_3$ and $LaAlO_3$ and improving the problems encountered in the conventional art.

To achieve the above objects, there is provided a dielectric material for a microwave of $CaTiO_3$-$La(Mg_{1/2}Ti_{1/2})O_3$-$LaAlO_3$ group which includes a composition condition of $0.3 \leq x \leq 0.6$ and $0 \leq y \leq 1.0$ wherein $(1-x)CaTiO_3$-$x[(1-y)La(Mg_{1/2}Ti_{1/2})O_3$-$yLaAlO_3]$.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
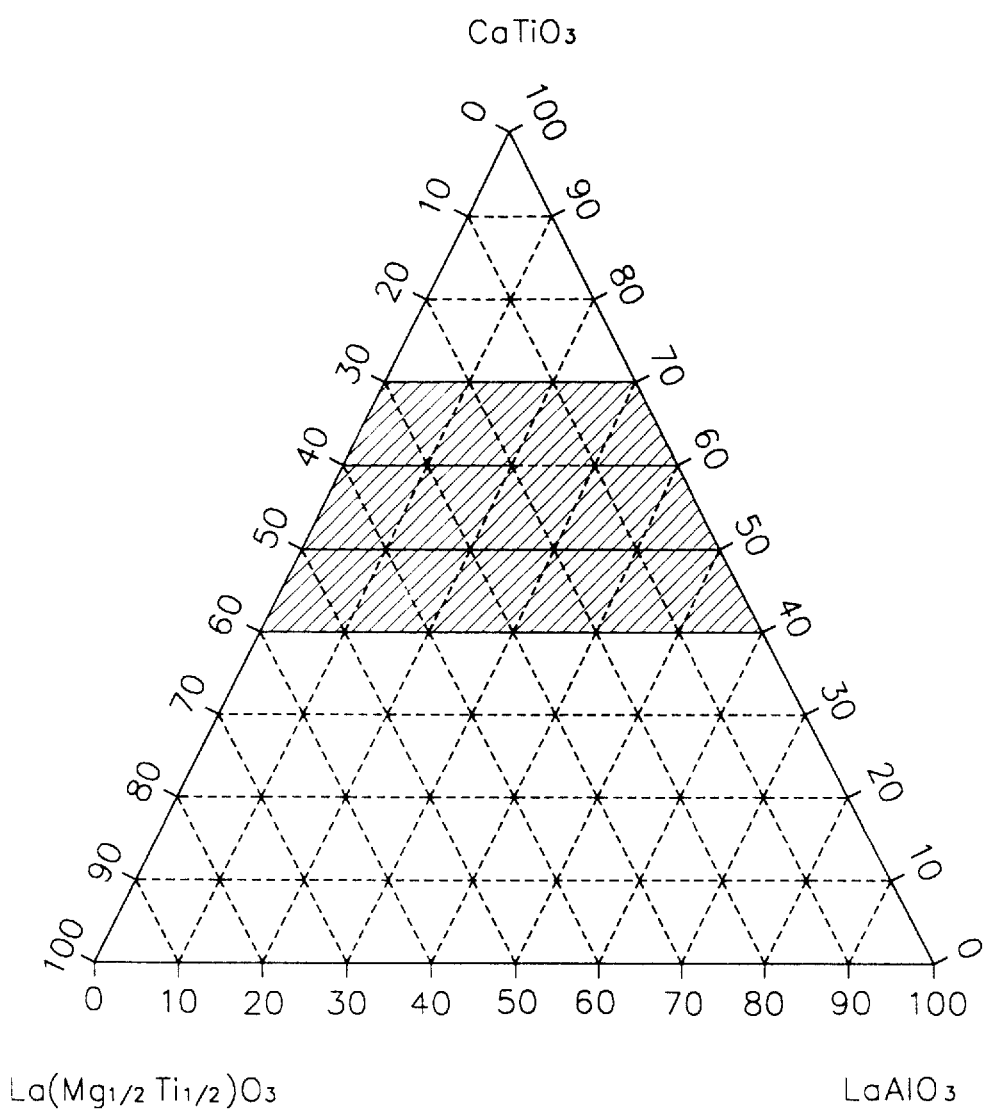
FIG. 1 is a $CaTiO_3$-$La(Mg_{1/2}Ti_{1/2})O_3$-$LaAlO_3$ composition diagram illustrating a composition range of a dielectric material according to the present invention.

As a dielectric material for a microwave, a perovskite type solid solution made of $CaTiO_3$ and $La(Mg_{1/2}Ti_{1/2})O_3$ as a main composition is used. The composition range thereof is shown in FIG. 1.

The range of the composition is limited because since the temperature coefficient of the resonant frequency of a dielectric is +50~-40ppm/°C., it is possible to fabricate a dielectric for a microwave having a low dielectric loss and a better temperature characteristic by using itself or by adding an additive thereto by a small amount.

The characteristic of a dielectric material for a microwave and a detailed fabrication method thereof according to the present invention will now be explained with reference to the following example.

EXAMPLE

As a source material powder, $CaCO_3$, $La_2O_3$, $Al_2O_3$, $TiO2$ and $MgO$ were used. The above-described material powders were accurately measured and mixed with each other based on the composition range shown in Table 1. The mixed material powders were calcinated in the air at a temperature of 1,250° C. for 4 hours, thus fabricating a solid solution having a perovskite structure.

The mixed powders were well ground, and then a circular test sample having a diameter of 15 mm and a thickness of 6~7 mm was fabricated by a pressure and molding method. Thereafter, the resultant structure was sintered in the air at a temperature 1,450°~1,550° C. for 2~6 hours. After the sintering was performed with respect thereto, the contraction rate of the test sample was 15~20%.

Both the side surfaces of the sintered test sample were well polished by using a polishing paper of #3000, and the dielectric constant, the value of Q, and the temperature coefficient of the resonant frequency were measured by a dielectric resonant method after inserting the polished test sample into an optical waveguide tube. At this time, the measuring frequency was 4~6GHz, and the measuring temperature range was -30°~80° C. The microwave dielectric characteristic of the test sample is shown in Table 1 by the composition rate.

Figure 2:
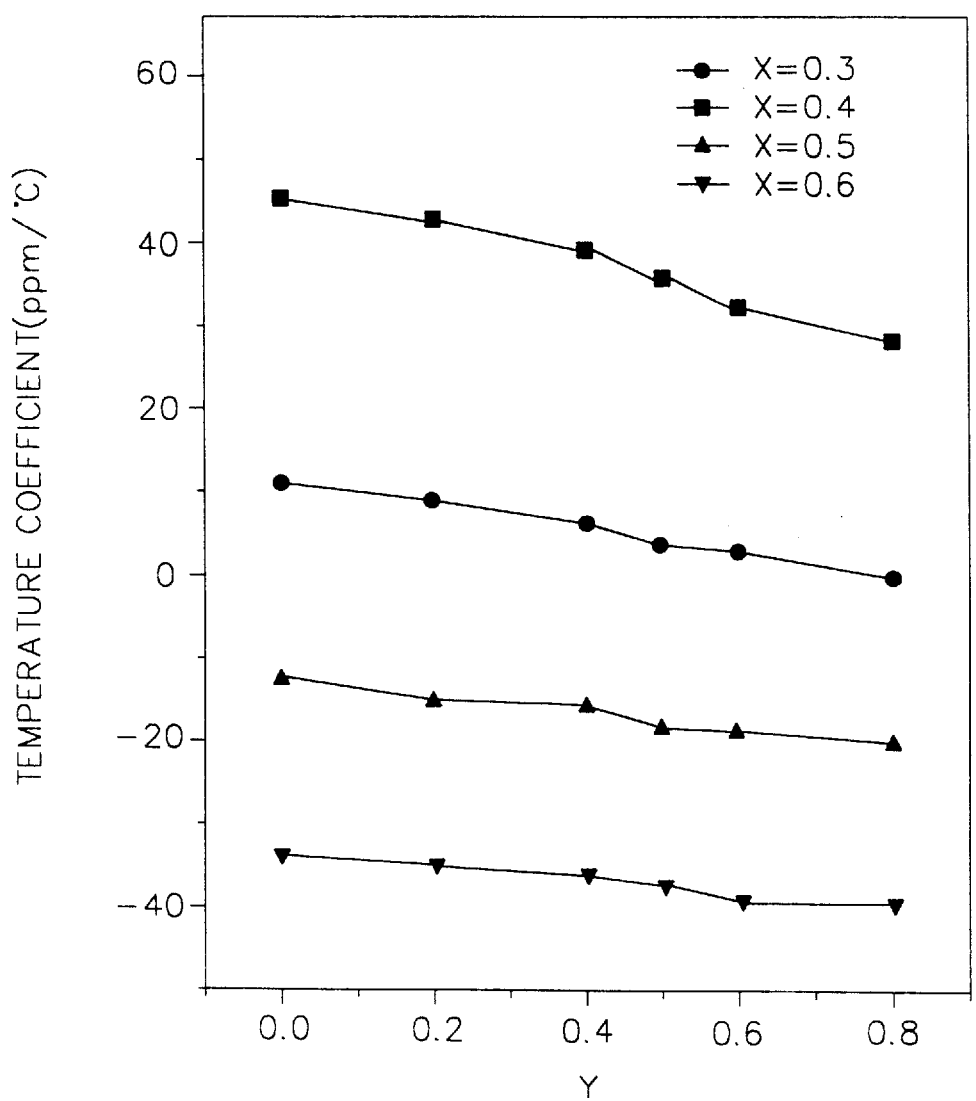
FIG. 2 is a graph illustrating a temperature coefficient of a resonant frequency in accordance with a composition variation of a dielectric material according to the present invention.

As shown in Table 1, there was not a great variation in the high frequency is dielectric characteristic in accordance with the added amount of $La(Mg_{1/2}Ti_{1/2})O_3$, but the high frequency dielectric characteristic was greatly varied in accordance with the added amount of $CaTiO_3$. Namely, as the added amount of $CaTiO_3$ is increased, the dielectric constant was steadily increased within a range of 30~50. However, the value of $[Qxf_o(GHz)]$ was greatly decreased, and the temperature coefficient of the resonant frequency was gradually varied within a range from a negative value to a positive value as shown in FIG. 2. Therefore, it is possible to fabricate a better microwave dielectric which contains 0.45~0.55 mol of $CaTiO_3$, having an dielectric constant of 42~48 and the value of $Qxf_o(GHz)$ of above 45,000, and a temperature coefficient of a resonant frequency of ±10 ppm/°C. In addition, it is possible to obtain a desired temperature coefficient of a resonant frequency which is variable from a positive (+) value to a negative value (-) under the same condition by adjusting the added amount of $CaTiO_3$.

TABLE 1

The high frequency dielectric characteristic of
$(1 - x)CaTiO_3-x[(1 - y)La(Mg_{1/2}Ti_{1/2})O_3-yLaAlO_3]$

| Test Sample No. | Composition (mol) | | Dielectric Constant | $Q \times f_o$ (GHz) | TCF (ppm/°C.) |
|---|---|---|---|---|---|
| | x | y | | | |
| 1 | 0.3 | 0 | 44.2 | 47842 | +47 |
| 2 | 0.3 | 0.2 | 44.4 | 46437 | +45 |
| 3 | 0.3 | 0.4 | 45.0 | 46743 | +40 |
| 4 | 0.3 | 0.5 | 45.9 | 44372 | +35 |
| 5 | 0.3 | 0.6 | 47.1 | 41748 | +31 |
| 6 | 0.3 | 0.8 | 47.6 | 40093 | +26 |
| 7 | 0.4 | 0 | 39.86 | 52247 | +15 |
| 8 | 0.4 | 0.2 | 40.02 | 51072 | +13 |
| 9 | 0.4 | 0.4 | 41.73 | 48092 | +12 |
| 10 | 0.4 | 0.5 | 42.36 | 52183 | +10 |
| 11 | 0.4 | 0.6 | 41.3 | 49979 | +9 |
| 12 | 0.4 | 0.8 | 40.26 | 49963 | +5 |
| 13 | 0.5 | 0 | 37.8 | 53323 | -13 |
| 14 | 0.5 | 0.2 | 37.6 | 52718 | -16 |
| 15 | 0.5 | 0.4 | 38.9 | 52643 | -17 |
| 16 | 0.5 | 0.5 | 40.5 | 52983 | -19 |
| 17 | 0.5 | 0.6 | 39.2 | 53040 | -20 |
| 18 | 0.5 | 0.8 | 37.3 | 53469 | -22 |
| 19 | 0.6 | 0 | 35.5 | 55443 | -33 |
| 20 | 0.6 | 0.2 | 36.4 | 54939 | -34 |
| 21 | 0.6 | 0.4 | 37.1 | 56843 | -35 |
| 22 | 0.6 | 0.5 | 38.8 | 57934 | -36 |
| 23 | 0.6 | 0.6 | 37.4 | 58326 | -38 |
| 24 | 0.6 | 0.8 | 33.6 | 58949 | -39 |

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A dielectric material for a microwave of a $CaTiO_3$-La$(Mg_{1/2}Ti_{1/2})O_3$-$LaAlO_3$ group, comprising a composition condition of $0.3 \leq x \leq 0.6$ and $0.2 \leq y \leq 0.8$ wherein (1-x) $CaTiO_3$-x [(1-y) La $(Mg_{1/2}Ti_{1/2})O_3$-$yLaAlO_3$].

2. The dielectric material of claim 1 wherein $0.45 \leq x \leq 0.55$.

* * * * *